(12) United States Patent
Stewart et al.

(10) Patent No.: US 7,493,823 B2
(45) Date of Patent: Feb. 24, 2009

(54) PRESSURE TRANSDUCER WITH DIFFERENTIAL AMPLIFIER

(75) Inventors: Carl E. Stewart, Plano, TX (US); Peter G. Hancock, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/455,040

(22) Filed: Jun. 16, 2006

(65) Prior Publication Data

US 2007/0289389 A1 Dec. 20, 2007

(51) Int. Cl.
*G01L 9/00* (2006.01)
(52) U.S. Cl. .......................................... 73/754; 73/756
(58) Field of Classification Search ................ 73/754, 73/756
See application file for complete search history.

(56) References Cited

U.S. PATENT DOCUMENTS

| | | | |
|---|---|---|---|
| 4,008,619 A | 2/1977 | Alcaide et al. | 73/398 C |
| 4,098,133 A | 7/1978 | Frische et al. | 73/702 |
| 5,155,061 A | 10/1992 | O'Connor et al. | 437/86 |
| 5,453,628 A | 9/1995 | Hartsell et al. | 257/76 |
| 5,459,351 A | 10/1995 | Bender | 257/417 |
| 5,528,452 A | 6/1996 | Ko | 361/283.4 |
| 5,535,135 A | 7/1996 | Bush et al. | 364/496 |
| 5,585,311 A | 12/1996 | Ko | 437/228 |
| 5,747,705 A | 5/1998 | Herb et al. | 73/862.59 |
| 5,808,210 A | 9/1998 | Herb et al. | 73/862.59 |
| 5,870,482 A * | 2/1999 | Loeppert et al. | 381/174 |
| 6,112,598 A | 9/2000 | Tenerz et al. | 73/756 |
| 6,167,763 B1 | 1/2001 | Tenerz et al. | 73/756 |
| 6,229,190 B1 | 5/2001 | Bryzek et al. | 257/419 |
| 6,263,740 B1 * | 7/2001 | Sridhar et al. | 73/754 |
| 6,445,053 B1 | 9/2002 | Cho | 257/417 |
| 6,452,427 B1 | 9/2002 | Ko et al. | 327/101 |
| 6,923,069 B1 | 8/2005 | Stewart | 73/723 |
| 6,945,118 B2 | 9/2005 | Maitland, Jr. et al. | 73/754 |
| 7,024,937 B2 | 4/2006 | James | 73/756 |

FOREIGN PATENT DOCUMENTS

| | | |
|---|---|---|
| JP | 57115873 A | 7/1982 |
| JP | 63065679 A | 3/1988 |
| JP | 63215929 A | 9/1988 |
| JP | 2004012406 A | 1/2004 |
| JP | 2004304052 A | 10/2004 |

OTHER PUBLICATIONS

*Interfacing Semiconductors Pressure Sensors to Microcomputers*, Motorola Inc. 1997 *Low Pressure Transducer Fully Temperature Compensated and Calibrated Dual-In-Line Package*; Silicon Microstructures Incorporated *Interfacing Semiconductor Pressure Sensors to Microcomputers*; AN1318 Rev 2, May 2005; Freescale Semiconductor, Inc. 2005.

* cited by examiner

*Primary Examiner*—Andre J Allen
(74) *Attorney, Agent, or Firm*—Luis M. Ortiz; Kermit D. Lopez

(57) ABSTRACT

A semiconductor-based pressure sensor adapted for enhanced operation with controls electronics includes a pressure transducer having an output formed on a silicon die and an amplifier having an input and an output and fabricated on the silicon die next to the pressure transducer. The pressure transducer's output is provided to the amplifier's input via electrical connection. Output from the amplifier is connectable to a controller such as an ASIC.

20 Claims, 4 Drawing Sheets

400

```
┌─────────────────────────────────────┐
│   Fabricate a silicon substrate with a   │  410
│ pressure sensor having a structure for   │
│   converting physical pressure into an   │
│    electrical signal, input and output   │
│  electrical connections for the sensor, an │
│     amplifier located next to the pressure │
│     sensor including an input electrical  │
│    connection connected to the output    │
│    electrical connection of the pressure  │
│       sensor, and an output electrical    │
│      connection from the amplifier       │
└─────────────────────────────────────┘
                    ↓
┌─────────────────────────────────────┐
│  Connect the output electrical connection │  420
│    of the pressure sensor to the input   │
│    electrical connection of the amplifier │
└─────────────────────────────────────┘
                    ↓
┌─────────────────────────────────────┐
│    Connect the output connection of the  │  430
│   amplifier to a pad which can accept an │
│    electrical connection to a separate   │
│                controller                │
└─────────────────────────────────────┘
```

FIG. 4

PRESSURE TRANSDUCER WITH DIFFERENTIAL AMPLIFIER

FIELD OF THE INVENTION

The present invention is generally related to pressure sensors. The present invention is also related to silicon-based pressure sensors requiring signal amplification. More particularly, the present invention is related to a silicon-based pressure sensor including co-located amplification circuitry on the same die.

BACKGROUND

Pressure sensors find wide use in industry: U.S. Pat. Nos. 6,452,427, 6,445,053, 6,229,190, 6,167,763, 6,112,598, 5,808,210, 5,747,705, 5,585,311, 5,535,135, 5,528,452, 5,459,351, 5,453,628, 5,155,061 4,098,133, 4,008,619.

The topside of a typical pressure sensor includes implanted piezoresistors to convert the pressure to an electrical signal, contacts to metal interconnections and bond pads used for wire bonding.

Silicon piezoresistor low pressure transducers can not be made cost effectively with a full scale output large enough to interface to control electronics. The size of the diaphragm and therefore the size of the die required to produce a sufficient span make the die cost prohibitive. This invention solves the problem by amplifying the signal of the transducer and allows the diaphragm/die size to remain small enough to be cost effective and provides sufficient span to the control electronics.

For low level pressure sensor, the sensitivity of the diaphragm is proportion to the size and thickness of the diaphragm. Larger signals require larger diaphragms, which are not cost effective. Therefore, for low pressure sensors, a method is needed to be able to interface the sensor with an ASIC that will do signal conditioning and temperature compensation for the sensor.

SUMMARY OF THE INVENTION

It is a feature of the present invention to provide a semiconductor-based pressure sensor adapted for enhanced operation with controllers (e.g., ASICs) by routing the pressure transducer's output to a differential amplifier which is disposed onto the same die that the sensor is processed on.

It is a another feature of the present invention that the output of the amplifier is then routed to output pads associated with the die wherefrom measurement and control electronics, including an ASIC, can be connected to obtained pressure measurements.

It is another feature of the present invention that the combined pressure sensor and amplifier can be made on the same die using the same processing steps required to fabricate a silicon-based pressure transducer.

It is another feature of the present invention that the amplifier co-located with the sensor produces a signal that can be easily interfaced by and used by the control electronics, such as an ASIC, to calibrate the transducer output over temperature and pressure.

BRIEF DESCRIPTION OF THE DRAWINGS

FIG. 4 illustrates a flow diagram of steps for utilizing the present invention of FIG. 1.

DETAILED DESCRIPTION

Figure 1:
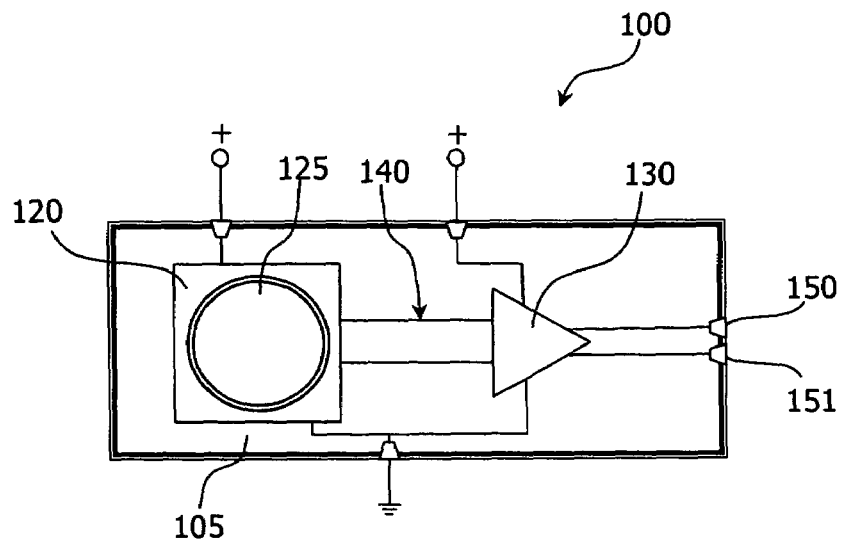
FIG. 1 illustrates a top view of a pressure sensor having a diaphragm and an amplifier collocated on the same semiconductor layer as the pressure sensor.

Referring to FIG. 1, a semiconductor-based pressure sensing device 100 is shown. On the device 100, a silicon substrate 105 has a pressure sensor 120 including a diaphragm 125 formed using methods known by those skilled in the art. The diaphragm 125 includes a surface whereon the media pressure to be measured is applied. An amplifier 130 is fabricated on the silicon substrate next to the sensor 120. The amplifier's input is electrically connected to the sensor's signal output as indicated by arrow 140. The amplifier's output can be electrically routed to a pad 150 or pads 150, 151 where external control electronics (not shown) can be connected to the device 100.

Figure 2:
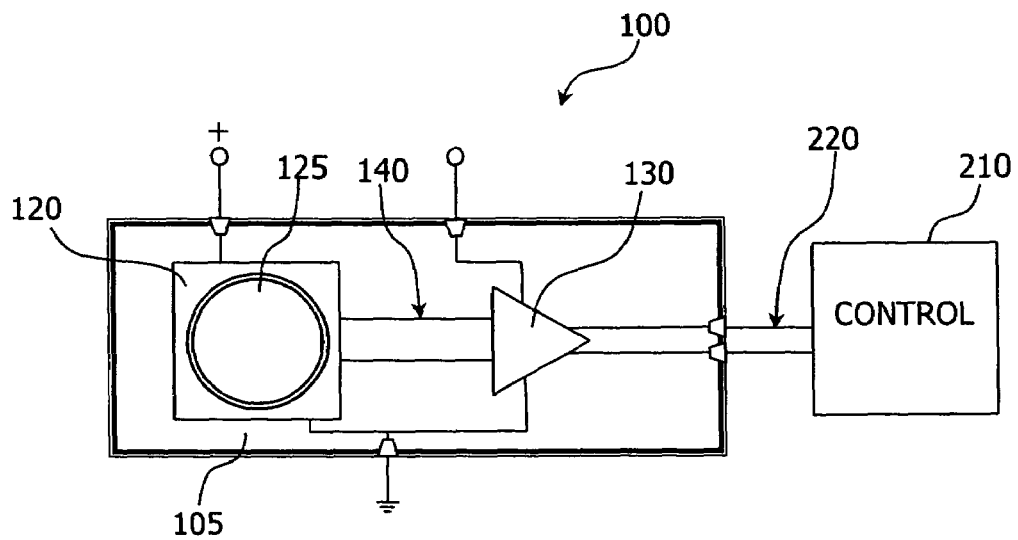
FIG. 2 illustrates a top view of the pressure sensor amplifier combination of FIG. 1 wherein the sensor circuit is connected to control electronics.

Referring to FIG. 2, output from the amplifier 130 of device 100 can be connected to the input of external control systems 210 as indicated by arrow 220. Because the signal from the sensor 120 is amplified by the co-located amplifier 130 before the pressure signal is sent to control electronics 210, such as an ASIC, better response can be achieved for a condition sensed by the sensor.

Figure 3:
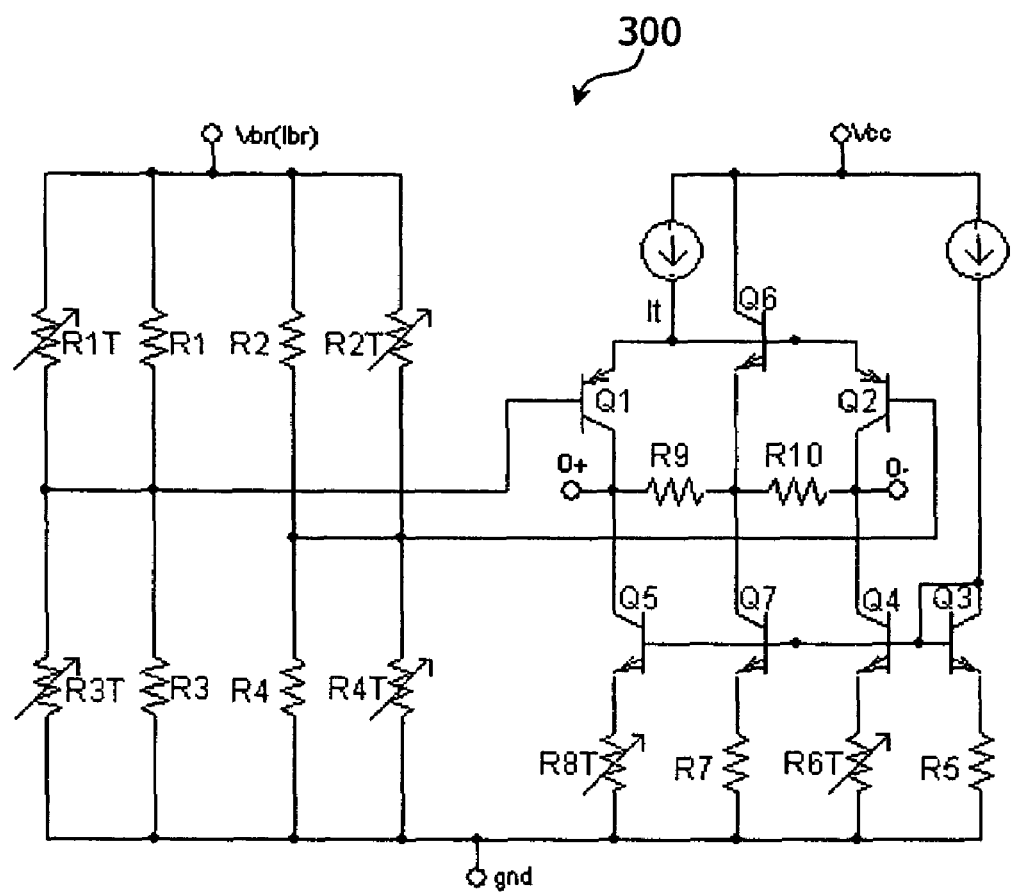
FIG. 3 illustrates a detailed schematic diagram of a pressure sensor amplifier combination in accordance with features of the present invention.

Referring to FIG. 3, a more specific illustration of a circuit diagram 300 representing the combined sensor amplifier device in accordance with the present invention is shown. In the illustrated circuit, all resistors can be made of the same material. Current sources are designed such that It*R is proportional to absolute temperature. Q4 and Q5 can carry ~It/2. Collector currents are trimmed using R8T and R6T to cancel inherent amplifier offset. Differential current flows through load resistors R9 and R10. The amplifier's gain is constant. The common mode signal on outputs is approximately Vbr/2. R1-R4 are bridge resistors. R1T-R4T are high value resistors used for trimming bridge offset. The bridge can be driven by constant voltage or constant current.

The invention is preferably made using photolithography, deposition and/or etching techniques familiar to those trained in the art of semiconductor processing. Semiconductor fabrication processes are in general well known. Referring to FIG. 4, steps in accordance with a novel method for fabricating and using a pressure sensor in accordance with providing features and advantages of the present invention are shown. As shown in Block 410, a silicon substrate is first fabricated with a pressure sensor having a structure for converting physical pressure into an electrical signal, input and output electrical connections for the sensor, an amplifier located next to the pressure sensor including an input electrical connection connected to the output electrical connection of the pressure sensor, and an output electrical connection from the amplifier. As shown in Block 420, the output electrical connection of the pressure sensor is connected to the input electrical connection of the amplifier. Then, as shown in Block 430, the output connection of the amplifier is connected to a pad or pads associated with the wafer. The pad(s) can accept an electrical connection to a controller located externally to the co-located sensor and amplifier package. During operation, power is connected to the input electrical connection associated with the pressure sensor and a controller is connected to the pad to obtain a signal from the output connection of the amplifier.

Figure 5:
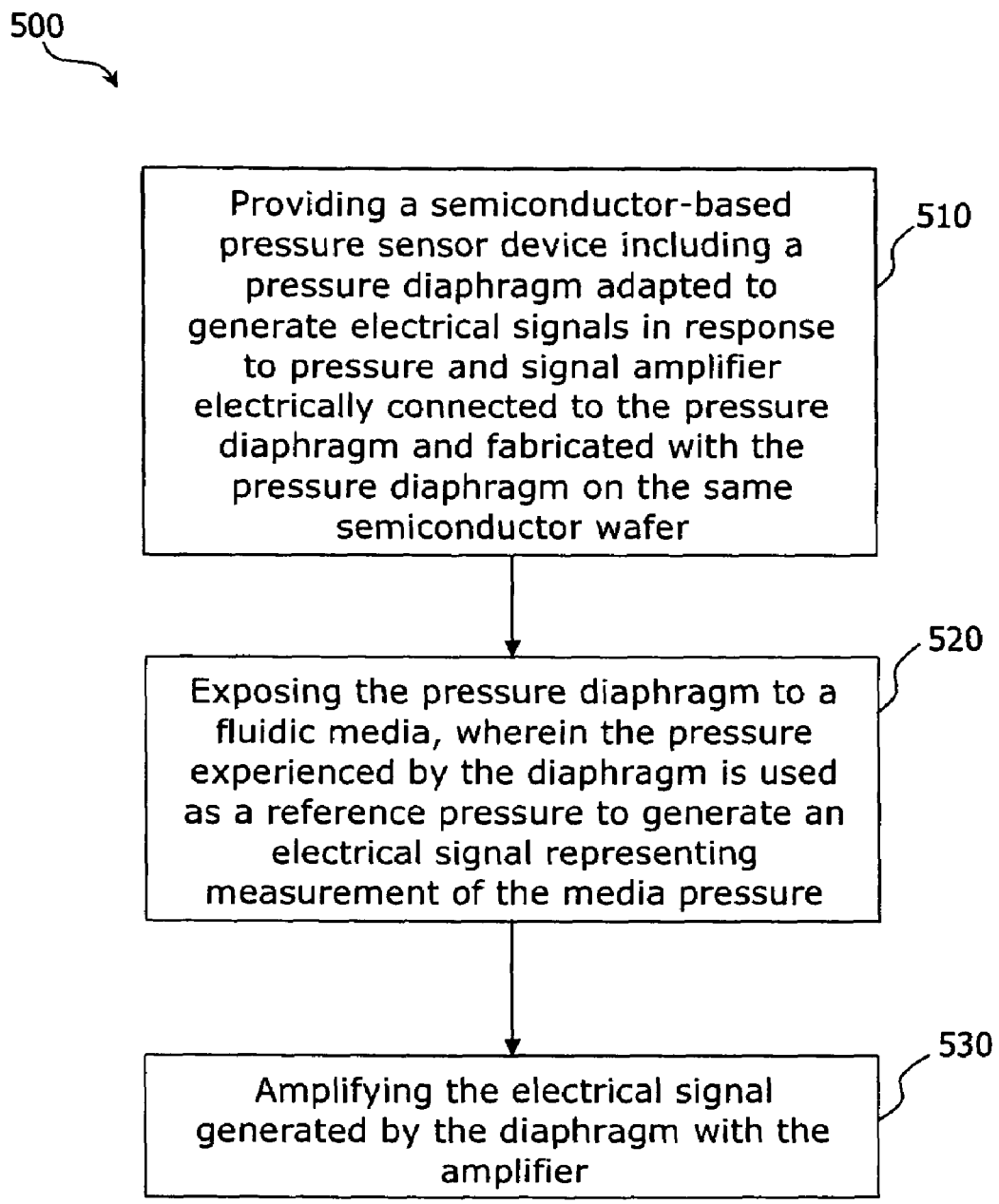
FIG. 5 illustrated a flow diagram of steps for fabricating the invention of FIG. 1.

It is well known that a pressure sensor's diaphragm must be exposed to the media being measured, recorded and analyzed. Electronic systems used for obtaining measurements from a sensor for further analysis and/or recording are well know. Referring to FIG. 5, a method of using the pressure sensor described in accordance with features of the present invention is shown. As shown in Block 510, a semiconductor-based pressure sensor device including a pressure diaphragm adapted to generate electrical signals in response to pressure and signal amplifier electrically connected to the pressure diaphragm and fabricated with the pressure diaphragm on the same semiconductor wafer is provided. As shown in Block 520, the pressure diaphragm is exposed to a fluidic media, wherein the pressure experienced by the diaphragm is used as a reference pressure to generate an electrical signal representing measurement of the media pressure. The electrical signal generated by the diaphragm is then amplified by the amplifier as shown in Block 530. The amplified signal can then be provided to a controller, such as an ASIC.

The invention claimed is:

1. A semiconductor-based pressure sensor adapted for enhanced operation with control electronics, comprising:
   a pressure transducer having an output formed on a silicon die; and
   an amplifier having an input and an output and fabricated on the silicon die next to the pressure transducer;
   wherein the pressure transducer's output is provided to the amplifier's input via electrical connection.

2. The semiconductor-based pressure sensor of claim 1 wherein the amplifier further comprises a differential amplifier.

3. The semiconductor-based pressure sensor of claim 1 wherein the output from the amplifier is connectable to a controller.

4. The semiconductor-based pressure sensor of claim 3 wherein the amplifier further comprises a differential amplifier.

5. The semiconductor-based pressure sensor of claim 2 wherein the output from the amplifier is connectable to a controller.

6. The semiconductor-based pressure sensor of claim 1 wherein output from the amplifier is routed to at least one output pad associated with the die wherefrom external measurement and control electronics are connectable.

7. The semiconductor-based pressure sensor of claim 6 wherein external measurement and control electronics are connected to at least one output pad.

8. The semiconductor-based pressure sensor of claim 6 wherein an ASIC is connected to the at least one output pad to calibrate the sensor's output over temperature and pressure.

9. The semiconductor-based pressure sensor of claim 2 wherein output from the amplifier is routed to at least one output pad associated with the die wherefrom external measurement and control electronics are connectable.

10. The semiconductor-based pressure sensor of claim 9 wherein external measurement and control electronics are connected to at least one output pad.

11. The semiconductor-based pressure sensor of claim 9 wherein an ASIC is connected to the at least one output pad to calibrate the sensors output over temperature and pressure.

12. A method, using a semiconductor-based pressure sensor device to measure pressure comprising:
   a semiconductor-based pressure sensor device including a pressure diaphragm adapted to generate electrical signals in response to pressure and signal amplifier electrically connected to the pressure diaphragm and fabricated with the pressure diaphragm on the same semiconductor wafer; and
   exposing the pressure diaphragm to a fluidic media, wherein the pressure experienced by the diaphragm is used as a reference pressure to generate an electrical signal representing measurement of the media pressure; and
   amplifying the electrical signal generated by the diaphragm with the amplifier.

13. The method of claim 12 wherein the amplifier comprises a differential amplifier.

14. The method of claim 12 wherein the output from the amplifier is connectable to a controller.

15. The method of claim 12 wherein output from the amplifier is routed to at least one output pad associated with the wafer wherefrom external measurement and control electronics are connectable.

16. The method of claim 15 wherein external measurement and control electronics are connectable to at least one output pad.

17. The method of claim 15 wherein an ASIC is connectable to the at least one output pad to calibrate the sensor's output over temperature and pressure.

18. A semiconductor-based pressure sensor adapted for enhanced operation with control electronics, comprising:
   a pressure transducer having an output formed on a silicon die; and
   a differential amplifier having an input and an output and fabricated on the silicon die next to the pressure transducer;
   wherein the pressure transducer's output is provided to the differential amplifier's input via electrical connection and the differential amplifier's output is connected to a controller.

19. The semiconductor-based pressure sensor of claim 18, said pressure transducer further comprising a pressure diaphragm adapted to generate electrical signals in response to pressure and signal said differential amplifier electrically connected to the pressure transducer.

20. The semiconductor-based pressure sensor of claim 18 wherein said pressure diaphragm is fabricated with the differental amplifier on the same semiconductor wafer.

* * * * *